United States Patent
Nasu et al.

(10) Patent No.: US 7,849,264 B2
(45) Date of Patent: Dec. 7, 2010

(54) STORAGE AREA MANAGEMENT METHOD FOR A STORAGE SYSTEM

(75) Inventors: Hiroshi Nasu, Yokohama (JP); Masayasu Asano, Yokohama (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 11/968,216

(22) Filed: Jan. 2, 2008

(65) Prior Publication Data
US 2008/0215843 A1    Sep. 4, 2008

(30) Foreign Application Priority Data
Feb. 23, 2007 (JP) ............................. 2007-044186

(51) Int. Cl.
*G06F 12/00* (2006.01)
(52) U.S. Cl. ...................................... 711/114
(58) Field of Classification Search ................ None
See application file for complete search history.

(56) References Cited
U.S. PATENT DOCUMENTS
2003/0009619 A1    1/2003    Kano et al.
2008/0091748 A1 *  4/2008    Beniyama et al. ........... 707/205

FOREIGN PATENT DOCUMENTS
JP    2003-015915    1/2003

* cited by examiner

*Primary Examiner*—Hiep T Nguyen
(74) *Attorney, Agent, or Firm*—Brundidge & Stanger, P.C.

(57) ABSTRACT

The load of managing a storage system is lessened. In a storage system where multiple logical volumes are included in a logical volume group and a copy of the logical volume group is made in a pool area different from the one to which the logical volume group belongs, a management computer adds to the pool area capacity when the capacity of a pool area exceeds a predetermined threshold. When the pool area includes multiple logical volume groups, the management computer requests the storage system to create a pool area for each of the logical volume groups and to create the logical volume groups respectively for the created pool areas. When the pool area includes one logical volume group, the management computer requests the storage system to make the capacity of the pool area coincide with the capacity of a pool area to which the logical volume group is copied.

20 Claims, 11 Drawing Sheets

| HOST WWN | DEVICE ID | LUN | MAXIMUM HOST-REQUESTED CAPACITY | ALLOCATED CAPACITY |
|---|---|---|---|---|
| 10:00:34:... | ST01 | 0 | 40000 | 4000 |
| 10:00:34:... | ST01 | 1 | 10000 | 1000 |
| 10:00:34:... | ST01 | 2 | 10000 | 1000 |
| 10:00:34:... | ST01 | 3 | 20000 | 2000 |
| 10:00:34:... | ST01 | 4 | 20000 | 2000 |
| 10:00:2E:... | ST02 | 1 | 10000 | 1000 |
| 10:00:2E:... | ST02 | 2 | 10000 | 1000 |
| 10:00:5A:... | ST03 | 1 | 20000 | 2000 |
| 10:00:5A:... | ST03 | 2 | 20000 | 2000 |

*FIG. 2*

| 2230 | 2231 | 2238 | 2232 | 2233 | 2234 | 2235 | 2236 | 2237 | 223 |
|---|---|---|---|---|---|---|---|---|---|
| DEVICE ID | POOL ID | CAPACITY | THRESHOLD | CTG ID | PRIMARY/ SECONDARY | PAIRED DEVICE ID | PAIRED POOL ID | LUN | |
| ST01 | P0 | 14500 | 10000 | n | - | - | - | 0 | |
| | | | | 1 | PRIMARY | ST02 | P0 | 1, 2 | |
| | | | | 2 | PRIMARY | ST03 | P0 | 3, 4 | |
| | P1 | 4200 | 3000 | - | - | - | - | - | |
| ST02 | P0 | 5000 | 4000 | 1 | SECONDARY | ST01 | P0 | 1, 2 | |
| ST03 | P0 | 10000 | 8000 | 2 | SECONDARY | ST01 | P0 | 1, 2 | |

*FIG. 3*

| 2240 | 2241 | 2242 | 224 |
|---|---|---|---|
| DEVICE ID | LUN | MIGRATION DESTINATION POOL ID | |
| ST01 | 0 | - | |
| | 1 | P2 | |
| | 2 | P2 | |
| | 3 | P3 | |
| | 4 | P3 | |
| ST02 | 1 | - | |
| | 2 | - | |
| ST03 | 1 | - | |
| | 2 | - | |

*FIG. 4*

| POOL ID | DISK ID | SEGMENT NUMBER | START ADDRESS | END ADDRESS | USE STATE |
|---|---|---|---|---|---|
| P0 | 0 | 0 | 0 | 499 | 1 |
| | | 1 | 500 | 999 | 0 |
| | | 3 | 1000 | 1499 | 1 |
| | | 4 | 1500 | 1999 | 0 |
| | | 5 | 2000 | 2499 | 0 |
| | | 6 | 2500 | 2999 | 1 |
| | 1 | 7 | 0 | 1499 | 1 |
| | | 8 | 1500 | 2999 | 0 |
| | 2 | 9 | 0 | 299 | 1 |
| | | 10 | 300 | 1299 | 0 |
| | | 11 | 1300 | 1999 | 1 |
| | 4 | 12 | | 299 | 1 |
| | | 13 | 300 | 999 | 1 |
| | | 14 | 1000 | 1499 | 1 |
| | 5 | 15 | 1500 | 3499 | 1 |
| | | 16 | 3500 | 3999 | 1 |
| | | 17 | 4000 | 4999 | 1 |
| P1 | 6 | 18 | 0 | 999 | 0 |
| | | 19 | 1000 | 1299 | 0 |
| | | 20 | 1300 | 2999 | 0 |
| | 7 | 14 | 0 | 299 | 0 |
| | | 15 | 300 | 999 | 0 |
| | | 16 | 1000 | 1199 | 0 |

*FIG. 5*

| LUN (3220) | SEGMENT NUMBER (3221) | START ADDRESS (3222) | END ADDRESS (3223) |
|---|---|---|---|
| 0 | 0 | 0 | 500 |
| 0 | 14 | 500 | 1000 |
| 0 | 15 | 1000 | 3000 |
| 1 | 3 | 0 | 500 |
| 1 | 16 | 500 | 1000 |
| 2 | 9 | 0 | 300 |
| 2 | 13 | 300 | 1000 |
| 3 | 6 | 0 | 500 |
| 3 | 7 | 500 | 2000 |
| 4 | 11 | 0 | 700 |
| 4 | 12 | 700 | 1000 |
| 4 | 17 | 1000 | 2000 |

*FIG. 6*

STORAGE AREA MANAGEMENT METHOD FOR A STORAGE SYSTEM

CLAIM OF PRIORITY

The present application claims priority from Japanese patent application JP 2007-044186 filed on Feb. 23, 2007, the content of which is hereby incorporated by reference into this application.

BACKGROUND OF THE INVENTION

The present invention relates to a storage system that provides a host computer with a storage area dynamically expandable in capacity.

A common computer system is composed of a host computer which processes a task and a storage system which reads/writes data as instructed by the host computer. The storage system provides multiple volumes in which data is stored and read/written. Storage systems today can have numerous large-capacity physical disks and their storage capacity is increasing.

In the storage systems, a redundant array of inexpensive disks (RAID) configuration disk array is built from physical disks and a pool area is created by aggregating one or more physical storage resources. From the created pool area, a storage area having as large a capacity as requested by a host computer is created as a logical volume and provided to the host computer.

The increase in storage capacity of storage systems increases the size of a storage area requested by a host computer. The initial cost for physical disks in introducing such a large-scale storage system could be enormous.

As a solution to this problem, JP 2003-15915 A discloses a technique in which, instead of having all physical disks that correspond to a capacity to be provided to a host computer at the ready upon introduction, a storage system adds a physical disk as the need arises after the used disk capacity nears the upper limit, and thereby dynamically changes the storage capacity provided to the host computer. The technique disclosed in JP 2003-15915 A enables the above-mentioned storage system to provide virtual logical volumes to a host computer without creating logical volumes of a fixed capacity from a pool area. Upon request from the host computer, storage areas of a given unit (this storage area unit will hereinafter be referred to as "segment") are dynamically allocated to the virtual logical volumes from a pool area, which is an aggregation of physical storage resources. The technique thus dynamically expands the capacity and lowers the initial cost upon introduction of the storage system.

Logical volumes to which segments are allocated from one pool area can be assigned to different uses such as volume local copy for backup, volume remote copy for disaster recovery in order to continue a task despite a system failure or a disaster, and normal tasks other than volume copy.

The local copy is a technology for duplicating data in a storage area inside a storage system to a storage area inside the same storage system. The remote copy is a technology for duplicating data in a storage area inside a storage system to a storage area inside another storage system. In the volume copy, multiple logical volumes are grouped into one and the consistency in the order of data update is kept within the logical volume group. A group of logical volumes as this is called a consistency group (CTG). One pool area may contain one CTG or more than one CTG.

A storage system avoids failure in expanding logical volume capacity due to too few segments allocated to logical volumes from a pool area, in other words, due to too little pool capacity, by monitoring for a shortage of pool capacity. When a shortage of pool capacity is detected, the storage system adds to the pool capacity by expanding the pool area.

In the remote copy, capacity monitoring and capacity addition have to be performed on a pool area in a storage system that contains the copy source volume (primary volume) and a pool area in a storage system that contains the copy destination volume (secondary volume). In the case where the pool capacity is increased to supplement a shortage of pool capacity on the primary volume side during suspension of data copy between the paired volumes (primary volume and secondary volume) in remote copy, pool capacity addition processing has to be performed also on the pool area on the secondary volume side in order to solve capacity shortage before the data copy between the paired volumes can be resumed. This delays the remote copy processing by a time required to finish the capacity addition processing for the secondary volume.

SUMMARY OF THE INVENTION

A representative aspect of this invention is as follows. That is, there is provided a storage area management method for a computer system having a storage system, a host computer coupled to the storage system via a network, and a management computer that can access to the storage system and the host computer, the storage system having a first interface coupled to the network, a first processor coupled to the first interface, a first memory coupled to the first processor, and a storage device for storing data read and written by the host computer, the management computer having a second interface coupled to the network, a second processor coupled to the second interface, and a second memory coupled to the second processor, the storage system having a pool area which includes the storage device, the pool area having logical volumes which are created to be provided to the host computer as storage areas where data is read and written by the host computer, the logical volumes having a predetermined relation and being included in a logical volume group, a copy of the logical volume group being created in a pool area different from the pool area to which the logical volume group belongs, the storage management method comprising: monitoring, by the second processor, a capacity of the pool area; sending, by the second processor, a request to the storage system to add to the capacity of the pool area when an unused capacity of the pool area reaches a predetermined threshold or lower; sending, by the second processor, a request to the storage system to create a pool area for each of the logical volume groups included in the pool area when the pool area includes multiple logical volume groups; sending, by the second processor, a request to the storage system to create the logical volume groups included in the pool area, respectively for the created pool areas; and sending, by the second processor, a request to the storage system to operate a pool area in which the copy of the one logical volume group included in the pool area is created when the pool area includes one logical volume group.

According to an embodiment of this invention, a pool area is created for each group of logical volumes that have a certain relation such as CTG, and the burden on a management computer in managing pool areas can be thus lessened.

BRIEF DESCRIPTION OF THE DRAWINGS

The present invention can be appreciated by the description which follows in conjunction with the following figures, wherein:

FIG. 2 is a diagram showing an example of a volume management table according to the embodiment of this invention;

FIG. 3 is a diagram showing an example of a pool management table according to the embodiment of this invention;

FIG. 4 is a diagram showing an example of a volume migration management table according to the embodiment of this invention;

FIG. 5 is a diagram showing an example of a segment management table according to the embodiment of this invention;

FIG. 6 is a diagram showing a physical-logical management table according to the embodiment of this invention;

DETAILED DESCRIPTION OF THE PREFERRED EMBODIMENT

An embodiment of this invention will be described below with reference to the accompanying drawings.

Figure 1A:
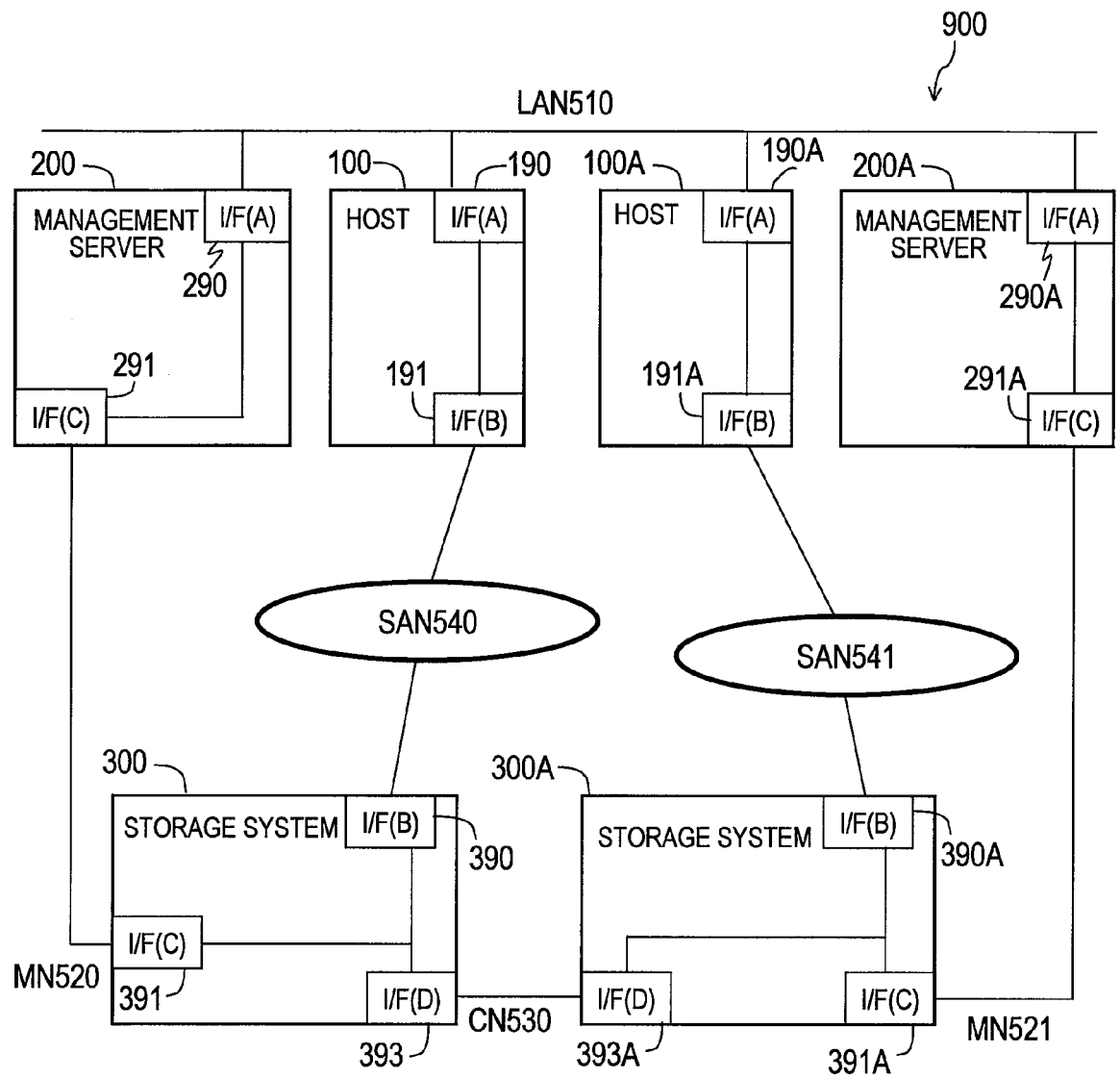
FIG. 1A is an explanatory diagram showing a configuration of a computer system according to the embodiment of this invention.

FIG. 1A is an explanatory diagram showing the configuration of a computer system according to the embodiment of this invention. A computer system 900 has one or more host computers 100 and 100A, management servers 200 and 200A, and storage systems 300 and 300A.

The host computer 100 and the storage system 300 are connected to each other via a storage area network (SAN) 540. The storage system 300 is connected to the management server 200 via a management network (MN) 520. Similarly, the storage system 300A is connected to the management server 200A via a management network (MN) 521.

The host computers 100 and 100A and the management servers 200 and 200A are connected to one another via a local area network (LAN) 510. The storage system 300 and the storage system 300A are connected to each other via a data copy network (CN) 530. There are one host computer 100 and one host computer 100A in this embodiment, but the computer system 900 may have multiple host computers 100 and host computers 100A.

The management servers 200 and 200A may be integrated into only one management server connected to the storage systems 300 and 300A. The LAN 510, the management network MN 520, and the SAN 540 may be one same network.

Figure 1B:
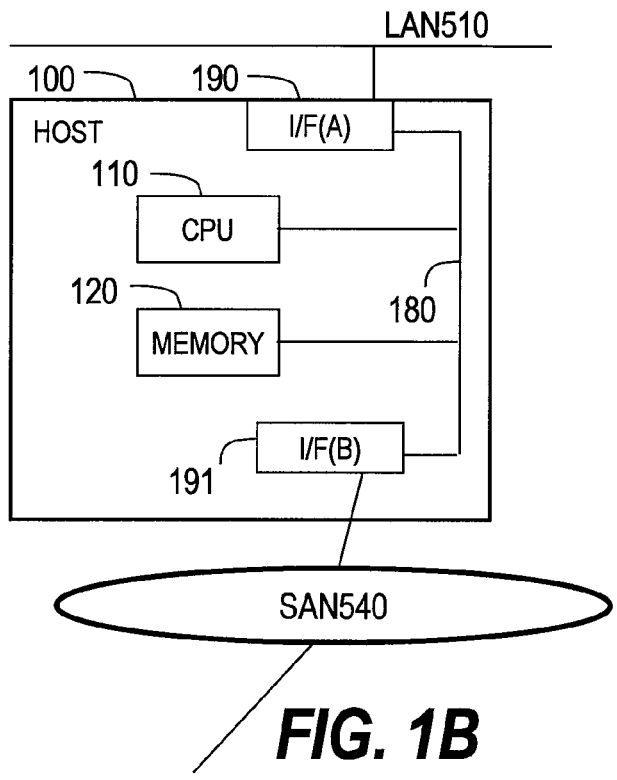
FIG. 1B is a block diagram showing a configuration of a host computer according to the embodiment of this invention.

The host computer 100 has a central processing unit (CPU) 110, a memory 120, an interface 190 for connecting the host computer 100 to the LAN 510, and an interface 191 for connecting the host computer 100 to the SAN 540, as shown in FIG. 1B. The CPU 110, the memory 120, the interface 190, and the interface 191 are connected to one another via a bus 180.

The CPU 110 executes a program stored in the memory 120, thereby implementing functions of the host computer 100. The memory 120 stores data and a program that are used by the CPU 110. The host computer 100 also has components (not shown) including a data input device used by a user of the host computer 100 to input data, and a display device for displaying information to a user of the host computer 100.

The host computer 100A is similar to the host computer 100 and has a CPU 110A, a memory 120A, an interface 190A for connecting the host computer 100A to the LAN 510, and an interface 191A for connecting the host computer 100A to the SAN 541. The CPU 110A, the memory 120A, the interface 190A, and the interface 191A are connected to one another via a bus 180A.

The CPU 110A executes a program stored in the memory 120A, thereby implementing functions of the host computer 100A. The memory 120A stores data and a program that are used by the CPU 110A. The host computer 100A also has components (not shown) including a data input device used by a user of the host computer 100A to input data, and a display device for displaying information to a user of the host computer 100A.

Figure 1C:
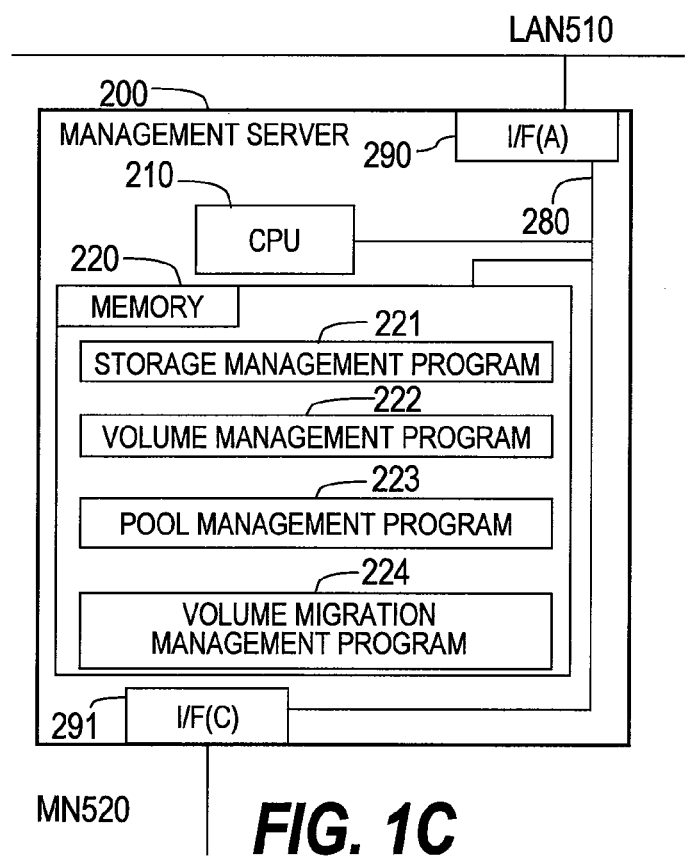
FIG. 1C is a block diagram showing a configuration of a management server according to the embodiment of this invention.

The management server 200 has a CPU 210, a memory 220, an interface 290 for connecting the management server 200 to the LAN 510, and an interface 291 for connecting the management server 200 to the management network MN 520, as shown in FIG. 1C. The CPU 210, the memory 220, the interface 290, and the interface 291 are connected to one another via a bus 280.

The CPU 210 executes a program stored in the memory 220, thereby implementing functions of the management server 200. The memory 220 stores data and a program that are used by the CPU 210. The memory 220 also stores a storage management program 221, a volume management table 222, a pool management table 223, and a volume migration management table 224.

The data and programs stored in the memory 220 are described below.

The storage management program 221 is executed by the CPU 210 to manage the configuration and the like of the storage system 300.

The volume management table 222 is a table for storing logical volume management information. An example of the volume management table 222 is shown in FIG. 2.

FIG. 2 is a diagram showing an example of the volume management table 222 according to the embodiment of this invention. The volume management table 222 contains a host WWN 2220, a device ID 2221, a logical unit number (LUN) 2222, a maximum host-requested capacity 2223, and an allocated capacity 2224.

The host WWN 2220 indicates an identifier for identifying a host computer. The device ID 2221 indicates an identifier for identifying a storage system. Stored as the LUN 2222 is an identifier for identifying a logical volume.

The maximum host-requested capacity 2223 indicates the maximum storage capacity of a storage area provided. The allocated capacity 2224 indicates the capacity of an actually allocated storage area. The management server 200 assumes that a host computer is provided with a storage area having a capacity that is indicated by the maximum host-requested capacity 2223, and adds a storage area capacity according to the capacity of actually stored data.

The pool management table 223 is a table showing information on a pool area. A pool area is created by, as described above, aggregating one or more physical storage resources. An example of the pool management table 223 is shown in FIG. 3.

FIG. 3 is a diagram showing an example of the pool management table 223 according to the embodiment of this invention. The pool management table 223 contains a device ID 2230, a pool ID 2231, a capacity 2238, a threshold 2232, a CTG ID 2233, a primary/secondary indicator 2234, a paired device ID 2235, a paired pool ID 2236, and a LUN 2237.

The device ID 2230 indicates an identifier for identifying a storage system. The pool ID 2231 indicates an identifier for identifying a pool area. The capacity 2238 indicates the maximum capacity of a pool area. The threshold 2232 indicates a threshold with which whether to expand a pool area is judged.

The CTG ID 2233 indicates an identifier for identifying a consistency group. A volume for which a value "n" is stored as the CTG ID 2233 is a single volume which does not have a copy volume. Stored as the primary/secondary indicator 2234 is a value for discriminating whether a logical volume is a copy source (primary volume) or a copy destination (secondary volume).

The paired device ID 2235 indicates an identifier for identifying which storage system has a storage area of a logical volume that constitutes the other half of the copy pair. The paired pool ID 2236 indicates an identifier for identifying from which pool area a storage area is allocated to the logical volume that constitutes the other half of the copy pair. Stored as the LUN 2237 is an identifier that is assigned to a logical volume belonging to a consistency group that is identified by the CTG ID 2233.

The volume migration management table 224 holds the identifier of a pool area to which a specified logical volume is moved for migration. An example of the volume migration management table 224 is shown in FIG. 4.

FIG. 4 is a diagram showing an example of the volume migration management table 224 according to the embodiment of this invention. The volume migration management table 224 contains a device ID 2240, a LUN 2241, and a migration destination pool ID 2242.

The device ID 2240 indicates an identifier for identifying a storage system. The LUN 2241 indicates an identifier for identifying a logical volume. The migration destination pool ID 2242 indicates an identifier for identifying which pool area is a volume migration destination.

The programs and tables stored in the memory 220 of the management server 200 are described above. The description now returns to FIG. 1.

Figure 1D:
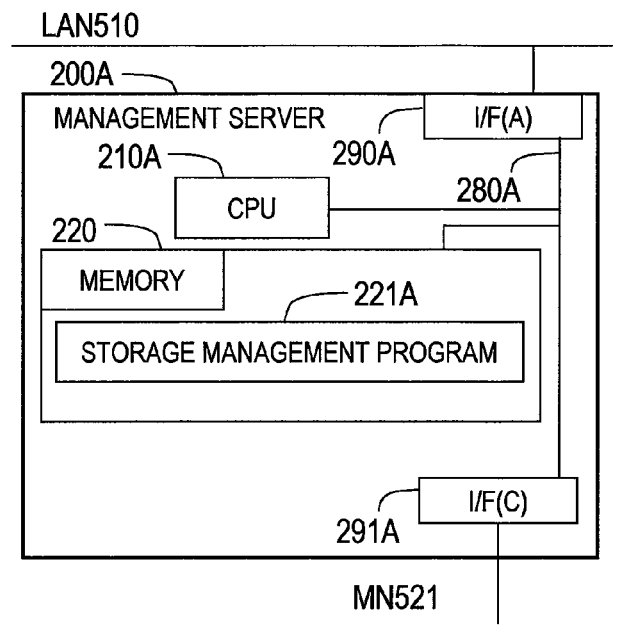
FIG. 1D is a block diagram showing a configuration of a management server according to the embodiment of this invention.

The management server 200A has a CPU 210A, a memory 220A, an interface 290A for connecting the management server 200A to the LAN 510, and an interface 291A for connecting the management server 200A to the management network MN 520, as shown in FIG. 1D. Those components are interconnected via a bus 280A. The management server 200A is used to continue a task when, for example, a failure occurs in the management server 200.

The CPU 210A executes a program stored in the memory 220A, thereby implementing functions of the management server 200A. The memory 220A stores data and a program that are used by the CPU 210A. The memory 220A stores a storage management program 221A. The storage management program 221A is a program executed by the CPU 210A to manage the configuration and the like of the storage system 300A.

The management server 200A also has components (not shown) including a data input device used by a user of the management server 200A to input data, and a display device for displaying information to a user of the management server 200A.

Figure 1E:
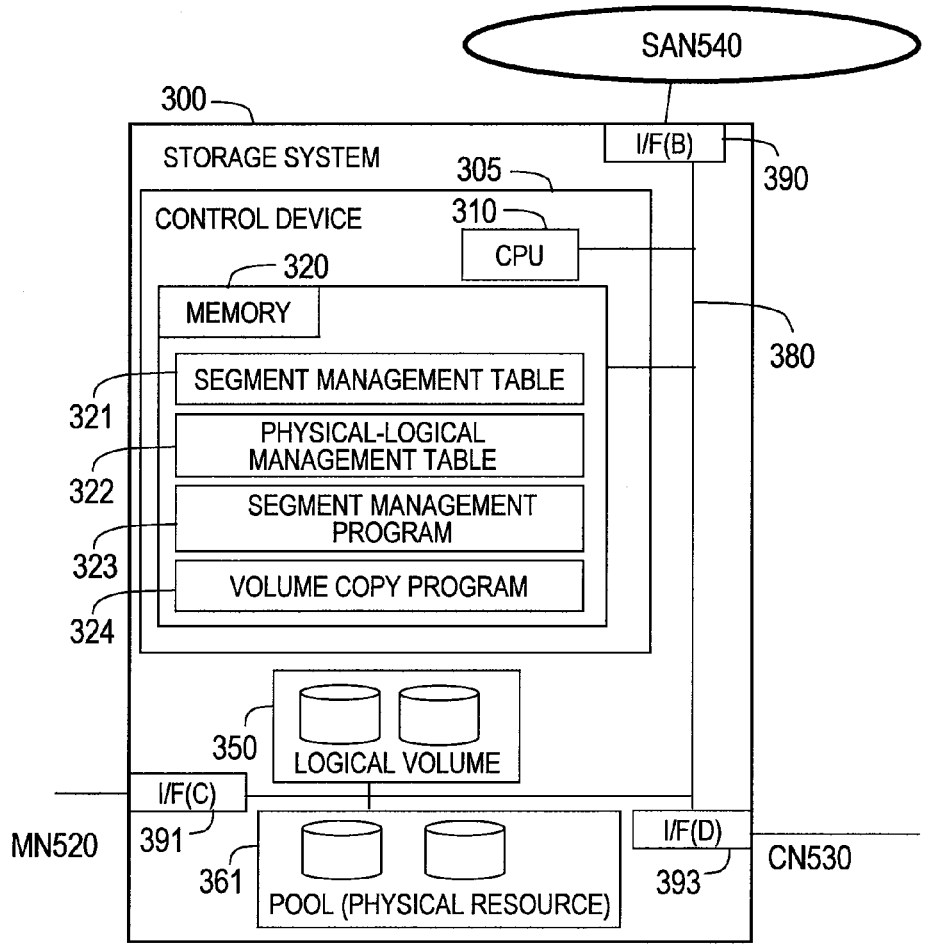
FIG. 1E is a block diagram showing a configuration of a storage system according to the embodiment of this invention.

The storage system 300 provides a data storage area to the host computer 100. The storage system 300 has a control device 305, a logical volume 350, a pool area 361, an interface 390 for connecting the storage system 300 to the SAN 540, and an interface 391 for connecting the storage system 300 to the management network MN 520, as shown in FIG. 1E. The control device 305, the logical volume 350, the pool area 361, the interface 390, and the interface 391 are connected to one another via a bus 380.

The control device 305 receives a data read/write request from a host computer and executes processing that meets the received request. The control device 305 has a CPU 310 and a memory 320.

The CPU 310 executes a program stored in the memory 320, thereby executing given processing.

The memory 320 stores a program executed by the CPU 310 and data that is used by the CPU 310 in executing various types of processing. The memory 320 also stores a segment management table 321, a physical-logical management table 322, a segment management program 323, and a volume copy program 324. The segment management program 323 and the volume copy program 324 are executed by the CPU 310.

The logical volume 350 is a virtual storage area provided to a host computer. The logical volume 350 is composed of one or more physical storage resources, and is provided to a host computer as a logical storage area in which data is stored.

The pool area 361 is a physical storage resource for allocating a segment to a virtual logical volume. The pool area 361 is composed of multiple physical disks as described above. FIG. 1 shows one pool area 361, but the storage system 300 may have more than one pool area 361.

The segment management table 321 is a table showing information about which segment is allocated to which volume. An example of the segment management table 321 is shown in FIG. 5.

FIG. 5 is a diagram showing an example of the segment management table 321 according to the embodiment of this invention. The segment management table 321 contains a pool ID 3210, a disk ID 3211, a segment number 3212, a segment start address 3213, a segment end address 3214, and a use state 3215.

The pool ID 3210 indicates an identifier for identifying a pool area. The disk ID 3211 indicates an identifier for identifying a physical disk in a pool area. The segment number 3212 is an identifier for identifying a segment allocated to a logical volume.

The segment start address 3213 and the segment end address 3214 indicate logical block addresses (LBAs). The size of a segment indicated by the segment start address 3213 and the segment end address 3214 may be a fixed value or a variable value.

In FIG. 5, "0" stored as the use state 3215 indicates that the volume is not in use whereas "1" stored as the use state 3215 indicates that the volume is in use. Other methods than this may be employed as long as they can be used to judge whether a volume is in use or not.

The physical-logical management table 322 is a table in which a segment allocated to the host computer 100 is associated with the LBA of a logical volume that the host computer 100 uses. An example of the physical-logical management table 322 is shown in FIG. 6.

FIG. 6 is a diagram showing a physical-logical management table according to the embodiment of this invention. The physical-logical management table 322 contains a LUN 3220, a segment number 3221, a start address 3222, and an end address 3223.

Stored as the LUN 3220 is an identifier assigned to a logical volume. Stored as the segment number 3221 is a number for identifying which segment constitutes a logical volume that is identified by the LUN 3220.

Stored as the start address 3222 and the end address 3223 are logical block addresses of a segment that is identified by the segment number 3221. Logical block addresses stored as the start address 3222 and the end address 3223 are logical block addresses unique throughout a logical volume.

The segment management program 323 is executed by the CPU 310 to manage segments allocated to logical volumes that provide storage areas to the host computer 100.

The volume copy program 324 is a program run by the CPU 310. Run by the CPU 310, the volume copy program 324 executes data copy between storage areas.

Figure 7:
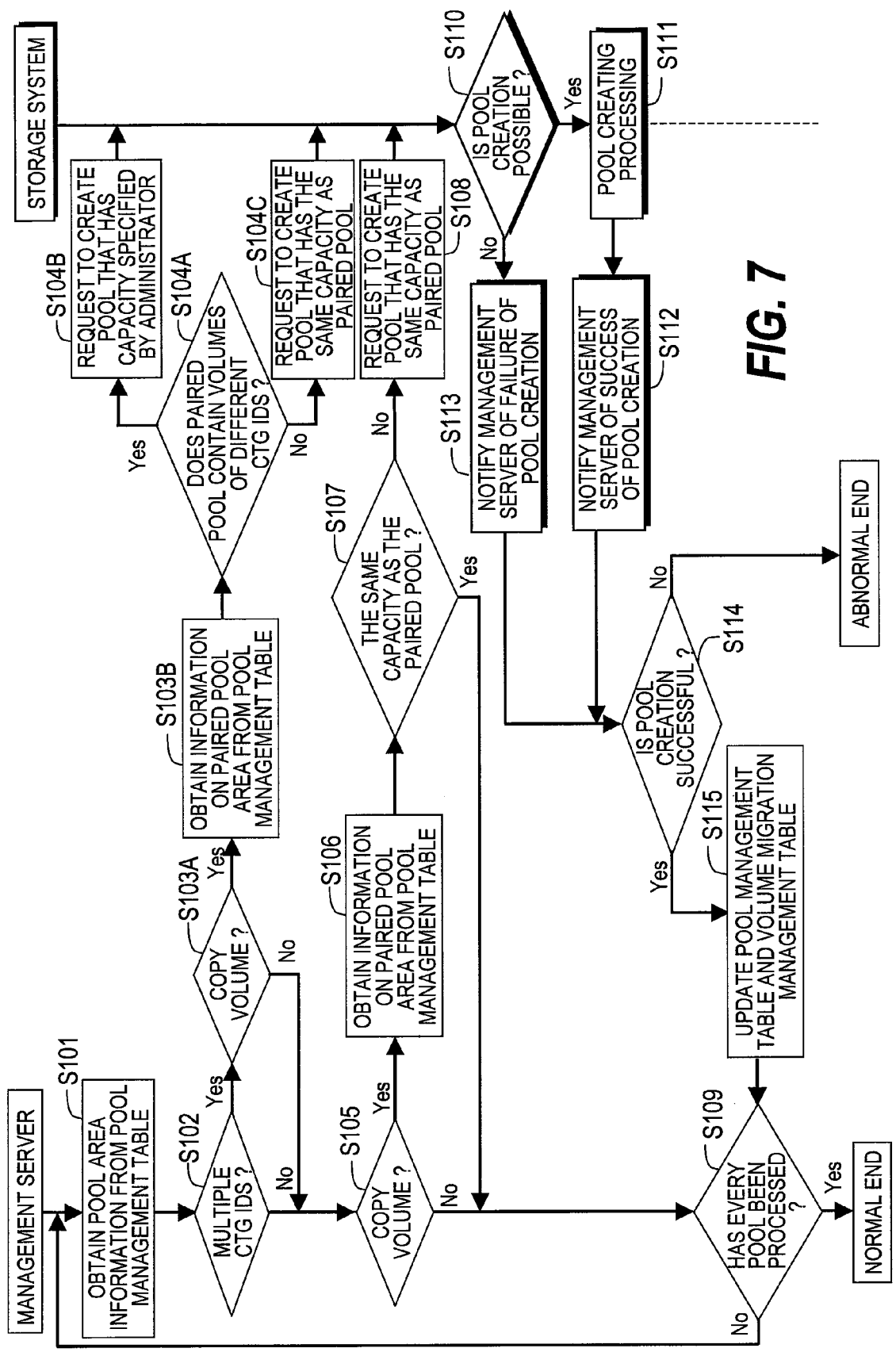
FIG. 7 is a flow chart showing steps of volume migration destination pool creating processing according to the embodiment of this invention.

FIG. 7 is a flow chart showing steps of volume migration destination pool creating processing according to the embodiment of this invention. This processing is executed when a storage area management method according to this invention is applied to a storage system for the first time. In FIG. 7, processing inside a shadowed frame indicates processing that is executed by the storage system.

The CPU 210 of the management server 200 executes the storage management program 221, to thereby retrieve the pool ID 2231 and the CTG ID 2233 from the pool management table 223 (S101).

The CPU 210 of the management server 200 judges whether or not multiple CTG IDs 2233 are registered for one pool ID 2231 (S102). Specifically, whether or not multiple consistency groups are stored in one pool area is judged.

When multiple consistency groups are stored in one pool area (when the result shows "Yes" in S102), the CPU 210 of the management server 200 judges for each of the consistency groups whether or not the consistency group is composed of copy volumes (S103A). A copy volume is a copy source volume or a copy destination volume, and accordingly is paired with a volume in pool areas other than the pool area to be processed that serves as its copy source or copy destination. A pool area storing a copy volume forms a pair with the pool area to be processed. In this embodiment, as described above, a consistency group whose CTG ID has values other than "n" is one that is composed of copy volumes.

When the consistency group to be processed is not composed of copy volumes (when the result shows "No" in S103A), the CPU 210 of the management server 200 processes other consistency groups contained in the same pool area.

When the consistency group to be processed is composed of copy volumes (when the result shows "Yes" in S103A), the CPU 210 of the management server 200 obtains from the pool management table 223 information on a pool area that constitutes the other half of the pair (S103B). Specifically, the CPU 210 of the management server 200 obtains the paired device ID 2235 and the paired pool ID 2236 and then obtains the capacity 2238 of the paired pool area from the obtained paired device ID 2235 and paired pool ID 2236.

The CPU 210 of the management server 200 refers to the paired pool area information obtained in the processing of S103B to judge whether or not the paired pool area contains volumes having different CTG IDs (S104A).

When the paired pool area contains volumes having different CTG IDs (when the result shows "Yes" in S104A), the CPU 210 of the management server 200 requests the storage system 300 to create a pool area that has a capacity specified by the administrator (104B). In other words, when one pool area contains multiple consistency groups, a pool area that constitutes the other half of the pair is newly created. Creating a pool area for each consistency group is accomplished in this manner. Accordingly, when there is a change in configuration of one pool area constituting a pair, changing the configuration of the other pool area of the pair has minimum effects on a different consistency group and a pool area that contains the different consistency group.

When the paired pool area does not contain volumes having different CTG IDs (when the result shows "No" in S104A), the CPU 210 of the management server 200 requests the storage system 300 to create a pool area having the same capacity as that of the paired pool area (104C).

When there is one CTG ID 2233 registered for one pool ID 2231 (when the result shows "No" in S102), the CPU 210 of the management server 200 judges whether or not the consistency group to be processed is a copy volume (S105).

When the consistency group to be processed is a copy volume (when the result shows "Yes" in S105), the CPU 210 of the management server 200 obtains information on a pool area that constitutes the other half of the pair as in the processing of S103B (S106). The CPU 210 of the management server 200 then judges whether or not the pool area to be processed and its paired pool area have the same capacity (S107).

When the pool area to be processed and its paired pool area have different capacities (when the result shows "No" in S107), the CPU 210 of the management server 200 requests the storage system 300 to create a pool area having the same capacity as that of the paired pool area (S108). When the pool area to be processed and its paired pool area have the same capacity (when the result shows "Yes" in S107), processing of S109 is executed.

The CPU 310 of the storage system 300 executes the segment management program 323 to receive a pool creation request sent from the management server 200 and to obtain the capacity of a pool area to be created. The CPU 310 of the storage system 300 obtains from the segment management table 321 the total capacity of physical disks to which pool areas are not allocated, and judges from the received pool creation request whether or not a pool area having the requested capacity can be created (s110).

When a pool creating capacity is equal to or smaller than the free physical disk capacity (when the result shows "Yes" in S110), a pool area can be created and the CPU 310 of the storage system 300 creates the requested pool area (S111). Specifically, a pool area of the requested capacity is created and data is added to the segment management table 321 in accordance with the received pool creation request.

The CPU 310 of the storage system 300 then sends a notification to the management server 200 to notify that the pool creation has been successful (S112). Along with the notification, the CPU 310 of the storage system 300 sends update information of the segment management table 321 updated through the processing of S111 to the management server 200.

On the other hand, when the capacity of the pool area to be created is larger than the free physical disk capacity (when the result shows "No" in S110), the CPU 310 of the storage system 300 sends a notification to the management server 200 to notify that the attempt to create the pool area has failed (S113).

The CPU 210 of the management server 200 receives a pool creation result from the storage system 300 and judges whether or not the pool creation has been successful (S114).

When the pool creation is a success (when the result shows "Yes" in S114), the CPU 210 of the management server 200 updates the pool management table 223 and the volume migration management table 242 (S115).

When the pool creation is a failure (when the result shows "No" in S114), the CPU 210 of the management server 200 sends an alert to a user who is operating the management server 200 and ends the pool creating processing.

The CPU 210 of the management server 200 judges whether or not the above-mentioned processing has been executed for every pool area it manages, in other words, for every pool ID contained in the pool management table 223 (S109). In a case where execution of the above-mentioned processing has been finished for every pool ID (when the result shows "Yes" in S109), the volume migration destination pool creating processing is ended. Otherwise, the processing of S101 is executed in order to perform the above-mentioned processing on an unprocessed pool area.

Figure 8:
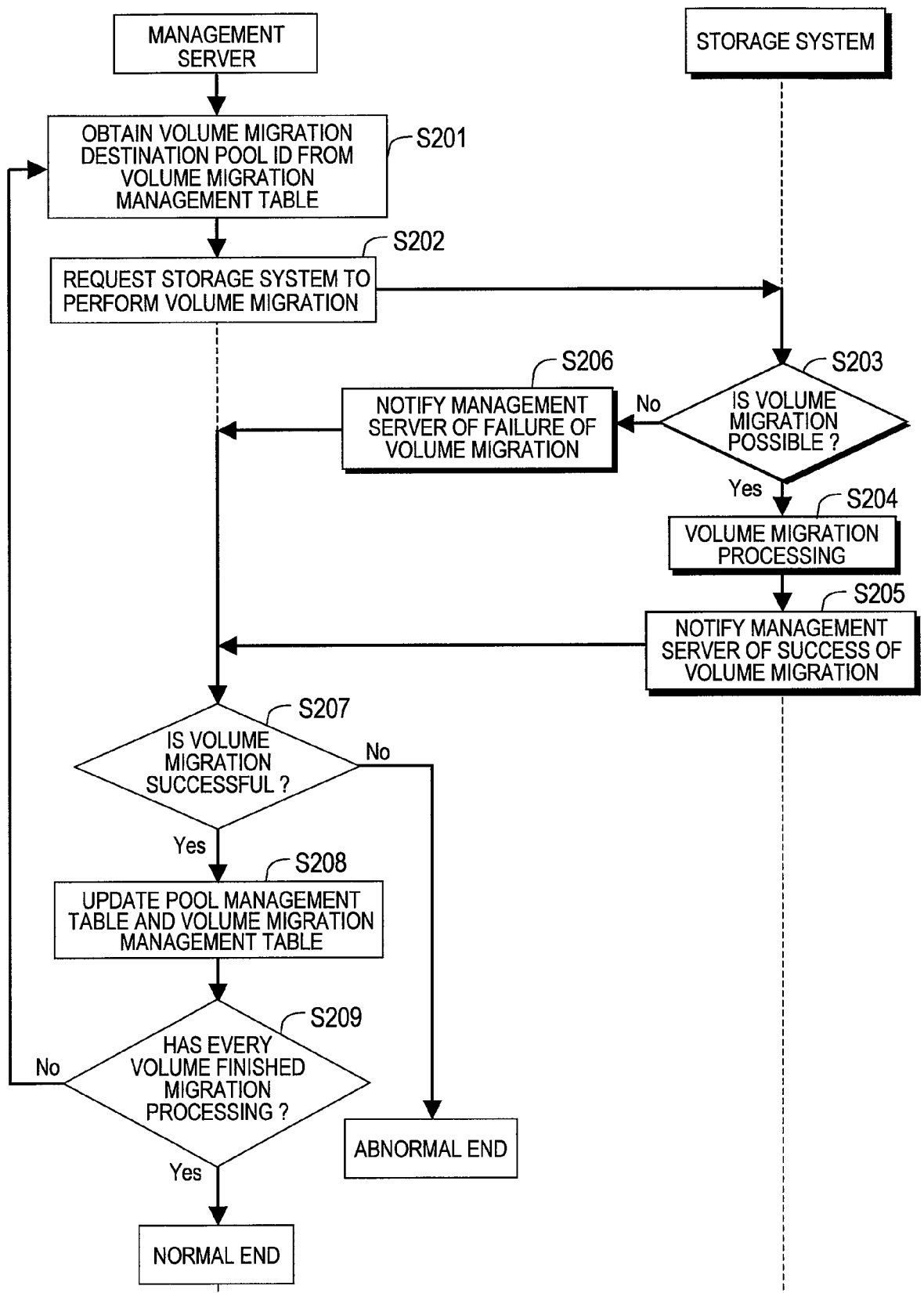
FIG. 8 is a flow chart showing steps of volume migration processing according to the embodiment of this invention.

FIG. 8 is a flow chart showing steps of volume migration processing according to the embodiment of this invention. In FIG. 8, processing inside a shadowed frame indicates processing that is executed by the storage system.

The CPU 210 of the management server 200 executes the storage management program 221, to thereby obtain from the volume migration management table 224 a pool area to be migrated (S201). Specifically, the device ID 2240 of the device from which a volume is to be migrated is obtained from the volume migration management table 224, and the LUN 2241 and the migration destination pool ID 2242 are obtained as well.

The CPU 210 of the management server 200 sends a volume migration request to the storage system 300 which is associated with the device ID 2240 obtained in the processing of S201 (S202). Along with the volume migration request, the CPU 210 of the management server 200 sends the LUN 2241 and the migration destination pool ID 2242 that have been obtained in the processing of S201 to the storage system 300.

The CPU 310 of the storage system 300 executes the segment management program 323 to receive a volume migration request and to obtain a logical volume that is to migrate and the pool ID of a pool area to which the logical volume migrates. Based on the received LUN and pool ID, the CPU 310 of the storage system 300 refers to the segment management table 321 and the physical-logical management table 322 to judge whether or not migration of the logical volume that is to migrate is possible (S203).

When the capacity of the migration destination pool area is equal to or larger than the capacity of the logical volume that is to migrate (when the result shows "Yes" in S203), the CPU 310 of the storage system 300 executes volume migration processing (S204).

The CPU 310 of the storage system 300 obtains from the physical-logical management table 322 segments that are allocated to the logical volume that is to migrate. Data stored in the obtained segments is then actually moved to the migration destination.

The CPU 310 of the storage system 300 moves data of each of the segments referring to the physical-logical management table 322. For a segment that has finished the migration, the CPU 310 of the storage system 300 changes the use state 3215 in a record entry of the segment management table 321 that holds the segment number 3212 of the finished segment to a value indicating that the segment is in use (a value "1").

The CPU 310 of the storage system 300 changes the segment number 3221 of each segment allocated to the logical volume that is to migrate from a segment number before the migration to a segment number after the migration in the physical-logical management table 322. For each segment that stores migration source data, the CPU 310 of the storage system 300 changes the use state 3215 in a record entry of the segment management table 321 that holds the segment number 3212 of the segment to a value indicating that the segment is not in use (a value "0").

The CPU 310 of the storage system 300 then sends a notification to the management server 200 to notify that the volume migration processing has succeeded (S205).

On the other hand, when the capacity of the migration destination pool area is smaller than the capacity of the logical volume that is to migrate (when the result shows "No" in S203), the CPU 310 of the storage system 300 sends a notification to the management server 200 to notify that the volume migration has failed.

The CPU 210 of the management server 200 receives a volume migration execution result from the storage system 300 and judges whether or not the volume migration has succeeded (S207).

When the volume migration is a success (when the result shows "Yes" in S207), the CPU 210 of the management server 200 updates the pool management table 223 and the volume migration management table 224 (S208). Specifically, in a record entry of the pool management table 223 for the logical volume that has finished migration, the pool ID 2231 is updated to the ID of the migration destination pool area. In a record entry of the volume migration management table 224 for the logical volume that has finished migration, the migration destination pool ID 2242 is cleared and the logical volume is excluded from a logical volume that is to migrate.

When the volume migration is a failure (when the result shows "No" in S207), the CPU 210 of the management server 200 sends an alert to a user who is operating the management server 200, and ends the volume migration processing.

The CPU 210 of the management server 200 judges whether or not migration processing has been executed for every logical volume (S209). When migration processing is finished for every logical volume (when the result shows "Yes" in S209), the CPU 210 of the management server 200 ends the volume migration processing. Otherwise, the CPU 210 of the management server 200 returns to the processing of S201 in order to execute migration processing for an unprocessed logical volume.

Figure 9:
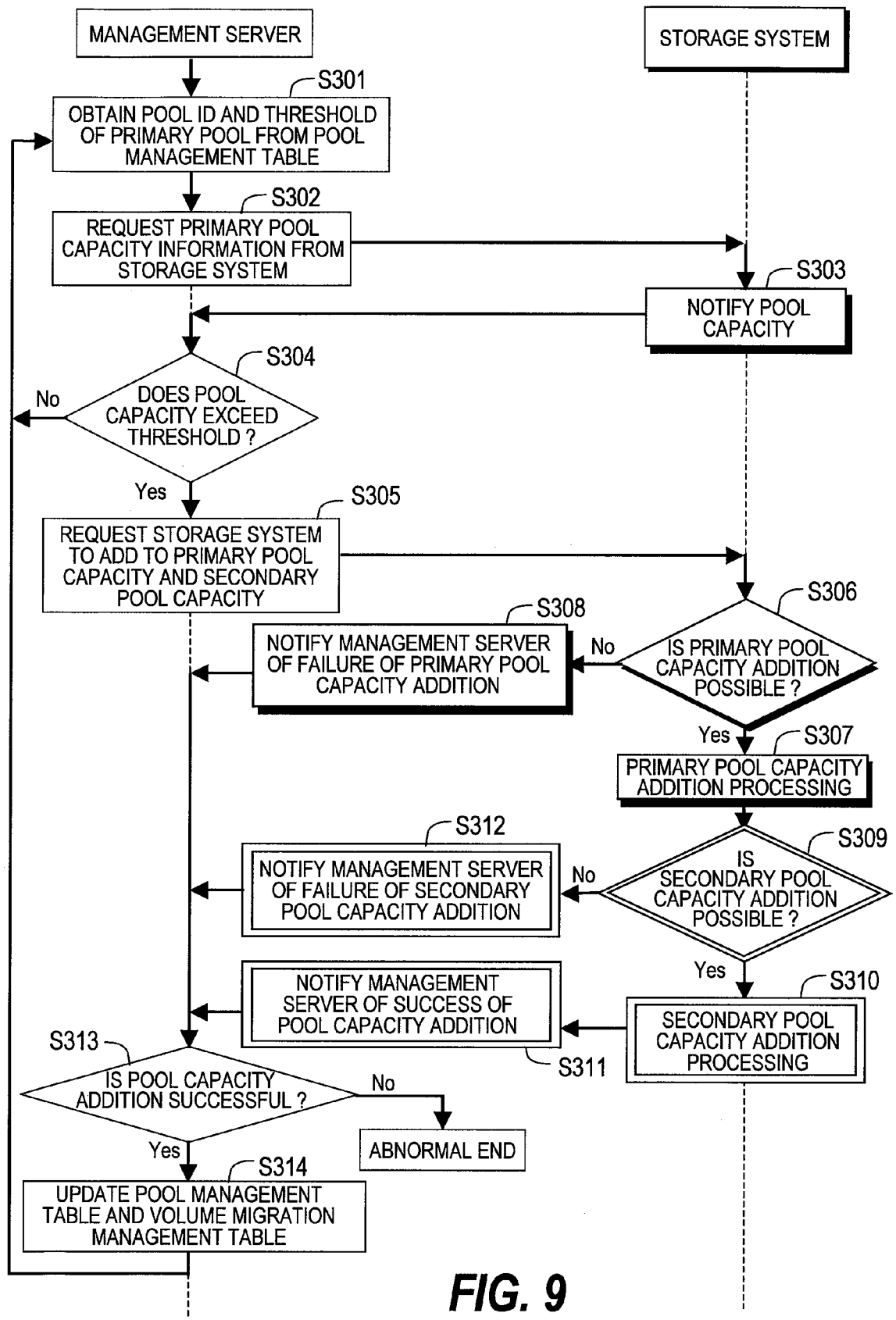
FIG. 9 is a flow chart showing steps of pool capacity monitoring and pool capacity addition processing according to the embodiment of this invention.

FIG. 9 is a flow chart showing steps of pool capacity monitoring and pool capacity addition processing according to the embodiment of this invention. This processing is executed while the storage system 300 is in operation. In FIG. 9, processing inside a shadowed frame is processing that is executed by the primary storage system whereas processing inside a frame-within-frame is processing that is executed by the secondary storage system.

The CPU 210 of the management server 200 executes the storage management program 221 to obtain the pool ID 2231 and the threshold 2232 from a record entry of the pool management table 223 whose primary/secondary indicator 2234 indicates "primary" (S301).

The CPU 210 of the management server 200 sends the pool ID obtained in the processing of S301 to the storage system 300 (S302).

The CPU 310 of the storage system 300 executes the segment management program 323 to receive the pool ID sent by the management server 200. The CPU 310 of the storage system 300 refers to the segment management table 321 to calculate the capacity of a storage area allocated to a logical volume from a pool area that is identified by the received pool ID, and sends the calculated capacity to the management server 200 (S303).

Receiving the pool capacity from the storage system 300, the CPU 210 of the management server 200 refers to the pool management table 223 to judge whether or not the received pool capacity exceeds the threshold 2232 (S304). When the received pool capacity does not exceed the threshold 2232 (when the result shows "No" in S304), the CPU 210 of the management server 200 returns to the processing of S301.

When the received pool capacity exceeds the threshold 2232 (when the result shows "Yes" in S304), the CPU 210 of the management server 200 sends a pool capacity addition request to the storage system 300 (S305). Along with the request, the CPU 210 of the management server 200 sends to the storage system 300 the pool ID 2231 obtained in the processing of S301 (the ID of the primary pool area), the paired pool ID 2236 (the ID of the secondary pool area), and a capacity specified by the user to be added to the pool areas.

The CPU 310 of the storage system 300 receives the pool ID of the primary pool area which has been obtained in the processing of S301, the pool ID of the secondary pool area, and the additional pool capacity, and then judges whether or not the specified capacity can be added to the primary pool area (S306).

When it is possible to add the specified capacity to the primary pool area (when the result shows "Yes" in S306), the CPU 310 of the storage system 300 adds the specified capacity to the primary pool area (S307). The CPU 310 of the storage system 300 thereafter updates the segment management table 321 and calculates the total capacity of the pool area.

When it is not possible to add the specified capacity to the primary pool area (when the result shows "No" in S306), the CPU 310 of the storage system 300 sends a notification to the management server 200 to notify that the capacity addition of the primary pool area has failed.

The CPU 310 of the storage system 300 judges whether or not the specified capacity can be added to the secondary pool area (S309).

When it is possible to add the specified capacity to the secondary pool area (when the result shows "Yes" in S309), the CPU 310 of the storage system 300 adds the specified capacity to the secondary pool area (S310). The CPU 310 of the storage system 300 thereafter updates the segment management table 321 and calculates the total capacity of the pool area.

When it is not possible to add the specified capacity to the secondary pool area (when the result shows "No" in S309), the CPU 310 of the storage system 300 sends a notification to the management server 200 to notify that the capacity addition of the secondary pool area has failed (S312).

Finishing the capacity addition of the secondary pool area, the CPU 310 of the storage system 300 sends a notification to the management server 200 to notify that the pool capacity addition has succeeded (S311).

The CPU 210 of the management server 200 receives a pool capacity addition result from the storage system 300 and judges whether or not the pool capacity addition has succeeded (S313). When the pool capacity addition is a success (when the result shows "Yes" in S313), the CPU 210 of the management server 200 updates the pool management table 223 (S314) and returns to the processing of S301.

When the pool capacity addition is a failure (when the result shows "No" in S313), the CPU 210 of the management server 200 sends an alert to the user who is operating the management server 200, and ends the pool capacity monitoring and pool capacity addition processing.

Figure 10:
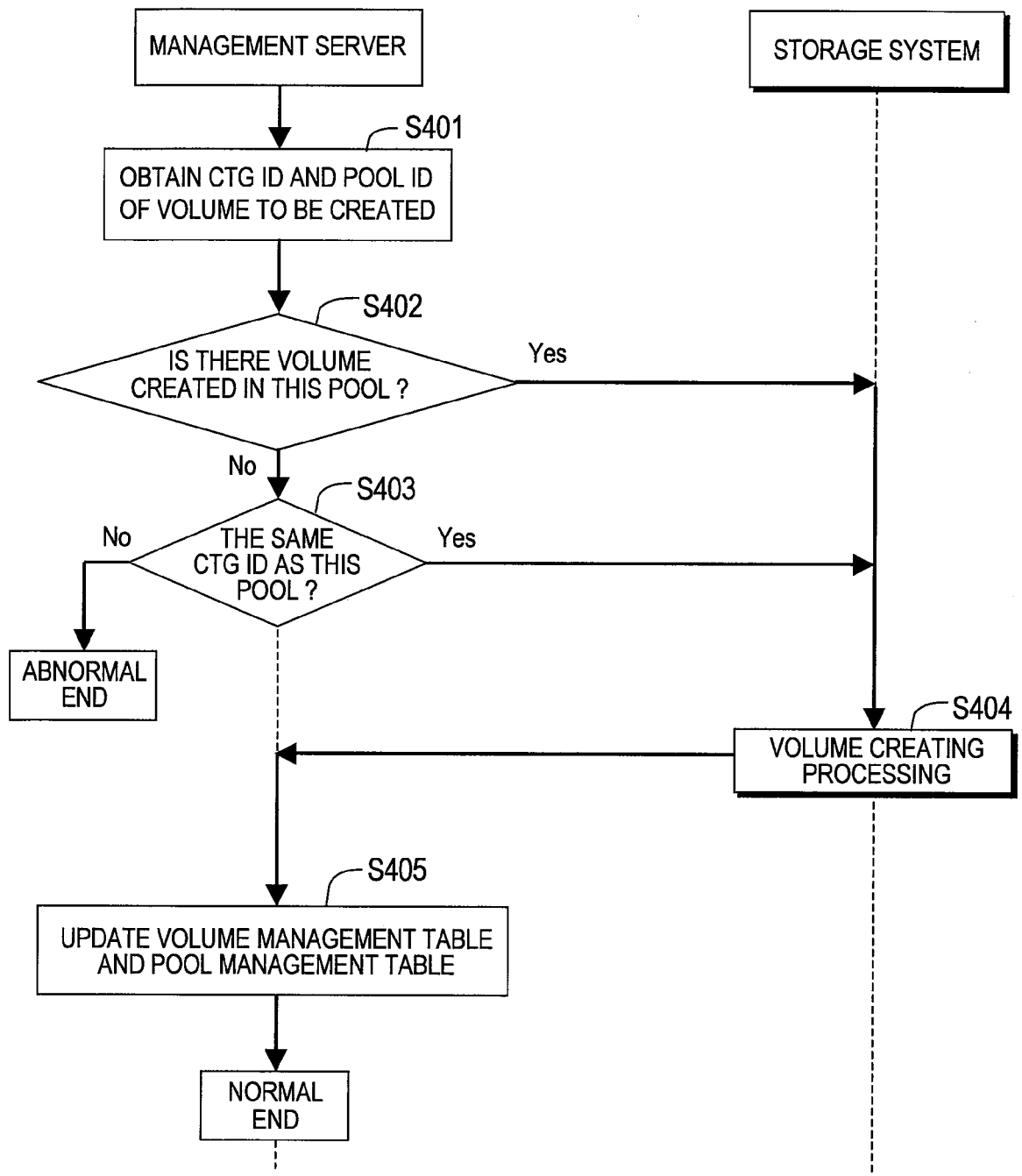
FIG. 10 is a flow chart showing steps of volume creating processing according to the embodiment of this invention.

FIG. 10 is a flow chart showing steps of volume creating processing according to the embodiment of this invention. This processing is executed in creating a logical volume in a pool area. In FIG. 10, processing inside a shadowed frame is processing that is executed by the storage system.

The CPU 210 of the management server 200 executes the storage management program 221, to thereby obtain the CTG ID of a consistency group to which a logical volume requested by a user to be created belongs, and the pool ID of a pool area that is associated with the requested logical volume (S401).

The CPU 210 of the management server 200 refers to the pool management table 223 to judge whether or not there is a logical volume created in the pool area that is identified by the pool ID obtained in the processing of S401 (S402).

When there is no logical volume created in the pool area (when the result shows "No" in S402), the CPU 210 of the management server 200 sends a volume creation request to the storage system 300. In sending the volume creation request, the CPU 210 of the management server 200 sends the capacity, CTG ID, and pool ID of the logical volume to be created to the storage system 300.

When there is a logical volume created in the pool area (when the result shows "Yes" in S402), the CPU 210 of the management server 200 refers to the pool management table 223 to judge whether or not the CTG ID of a consistency group to which the logical volume already created in the pool area belongs matches the CTG ID obtained in the processing of S401 (S403).

When the CTG ID of the consistency group in the specified pool area matches the CTG ID obtained in the processing of S401 (when the result shows "Yes" in S403), the CPU 210 of the management server 200 sends a volume creation request to the storage system 300. Along with the volume creation request, the CPU 210 of the management server 200 sends the capacity, CTG ID, and pool ID of the logical volume to be created to the storage system 300.

When the CTG ID of the consistency group in the specified pool area does not match the CTG ID obtained in the processing of S401 (when the result shows "No" in S403), the CPU 210 of the management server 200 sends an alert to a user who is operating the management server 200, and ends the volume creating processing.

The CPU 310 of the storage system 300 receives the volume creation request from the management server 200 and executes volume creating processing (S404). The CPU 310 of the storage system 300 then updates the segment management table 321 and the physical-logical management table 322. Thereafter, the CPU 310 of the storage system 300 sends a notification to the management server 200 to notify that the volume creating processing has been finished.

Receiving the volume creation completion notification from the storage system 300, the CPU 210 of the management server 200 updates the volume management table 222, the pool management table 223, and the volume migration management table 224 (S405), and then ends the volume creating processing.

According to the embodiment of this invention, expansion of the primary pool area is accompanied by expansion of the secondary pool area. Therefore, when the management server 200 monitors the capacity of a pool area in the storage system 300 to decide whether to add to the pool area capacity, only the primary pool area needs to be monitored and the burden of pool area management can be lessened.

Moreover, according to the embodiment of this invention, the capacity of the primary pool area and the capacity of the secondary pool area are equal to each other when data copy between paired volumes is resumed after suspension of the data copy. This eliminates the need to add to the pool area capacity before resuming the data copy, and accomplishes data copy between paired volumes without a delay that is caused by an addition of capacity to the pool area.

While the present invention has been described in detail and pictorially in the accompanying drawings, the present invention is not limited to such detail but covers various obvious modifications and equivalent arrangements, which fall within the purview of the appended claims.

What is claimed is:

1. A storage area management method for a computer system having a storage system, a host computer coupled to the storage system via a network, and a management computer that can access to the storage system and the host computer, wherein the storage system having a first interface coupled to the network, a first processor coupled to the first interface, a first memory coupled to the first processor, and a storage device for storing data read and written by the host computer, wherein the management computer having a second interface coupled to the network, a second processor coupled to the second interface, and a second memory coupled to the second processor, wherein the storage system having a pool area which includes the storage device, wherein the pool area having logical volumes which are created to be provided to the host computer as storage areas where data is read and written by the host computer, and wherein the logical volumes having a predetermined relation and being included in a logical volume group;

a copy of the logical volume group being created in a pool area different from the pool area to which the logical volume group belongs, wherein the storage management method comprising the steps of:

monitoring, by the second processor, a capacity of the pool area to which the logic volume belongs;

sending, by the second processor, a request to the storage system to add to the capacity of the pool area to which the logical volume belongs when an unused capacity of the pool area to which the logical volume belongs reaches a predetermined threshold or lower;

sending, by the second processor, a request to the storage system to create a sub-pool area for each of the logical volume groups included in the pool area to which the logical volume belongs when the pool area to which the logical volume belongs includes multiple logical volume groups;

sending, by the second processor, a request to the storage system to create the logical volume groups included in the pool area to which the logical volume belongs, respectively for the created sub-pool areas; and sending, by the second processor, a request to the storage system to operate a pool area in which the copy of the one logical volume group included in the pool area is created when the pool area includes one logical volume group.

2. The storage area management method according to claim 1, wherein an update order of the logical volumes included in the logical volume group is determined as the predetermined relation to maintain data consistency.

3. The storage area management method according to claim 1, wherein the copy of the logical volume group is created in a pool area of a storage system different from the storage system that includes the copy source logical volume group.

4. The storage area management method according to claim 1, wherein the operation the pool area is a request to create a pool area including the copy of the logical volume group, as the capacity of the created pool area is same capacity of the pool area including the copy source logical volume group.

5. The storage area management method according to claim 1, wherein the pool area includes a first pool area and a second pool area; and wherein the method further comprises the step of:

sending, by the second processor, when there is an addition to the first pool area capacity, a request to the storage system to make a capacity of the first pool area coincide with a capacity of the second pool area to which a logical volume group contained in the first pool area is copied.

6. The storage area management method according to claim 5, further comprising the step of:

monitoring, by the second processor, only the capacity of the first pool area.

7. The storage area management method according to claim 1, further comprising the step of:

prohibiting, by the second processor, when a logical volume is to be newly created in the pool area, to newly create a logical volume that does not belong to a logical volume group included in the pool area.

8. A management computer, comprising:

a processor; a memory; and an interface, wherein the management computer being able to access to a storage system having a storage device for storing data, and to a host computer coupled to the storage system via a network, wherein the storage system having a pool area which includes the storage device, wherein the pool area having logical volumes which are created to be provided to the host computer as storage areas where data is read and written by the host computer, and wherein the logical volumes having a predetermined relation and being included in a logical volume group, a copy of the logical volume group being created in a pool area different from the pool area to which the logical volume group belongs, wherein the processor is configured to:

monitor a capacity of the pool area to which the logical volume belongs;

request, when an unused capacity of the pool area to which the logical volume belongs reaches a predetermined threshold or lower, the storage system to add to the capacity of the pool area to which the logical volume belongs;

request, when the pool area to which the logical volume belongs contains multiple logical volume groups, the storage system to create a sub-pool area for each of the logical volume groups included in the pool area to which the logical volume belongs;

request the storage system to create the logical volume groups included in the pool area to which the logical volume belongs, respectively for the created sub-pool areas; and request, when the pool area to which the logical volume belongs includes one logical volume group, the storage system to operate a pool area in which the copy of the one logical volume group included in the pool area is created.

9. The management computer according to claim 8, wherein the logical volumes included in the logical volume group is determined as the predetermined relation to maintain data consistency.

10. The management computer according to claim 8, wherein the operation the pool area to which the logical volume belongs is a request to create a pool area including the copy of the logical volume group, as the capacity of the created pool area is same capacity of the pool area to which the logical volume belongs including the copy source logical volume group.

11. The management computer according to claim 8, wherein the pool area to which the logical volume belongs includes a first pool area and a second pool area; and
wherein the processor is further configured to, when there is an addition to the first pool area capacity, request the storage system to make a capacity of the first pool area coincide with a capacity of the second pool area to which a logical volume group contained in the first pool area is copied.

12. The management computer according to claim 11, wherein the processor is further configured to monitor only the capacity of the first pool area.

13. The management computer according to claim 8, wherein, the processor is further configured to, when a logical volume is to be newly created in the pool area to which the logical volume belongs prohibit a logical volume that does not belong to a logical volume group included in the pool area.

14. A computer system, comprising:
a storage system;
a host computer coupled to the storage system via a network; and
a management computer which can access to the storage system and the host computer,
wherein the storage system has a first interface coupled to the network, a first processor coupled to the first interface, a first memory coupled to the first processor, and a storage device for storing data read and written by the host computer,
wherein the management computer has a second interface coupled to the network, a second processor coupled to the second interface, and a second memory coupled to the second processor,
wherein the storage system has a pool area which includes the storage device,
wherein the pool area has logical volumes which are created to be provided to the host computer as storage areas where data is read and written by the host computer,
wherein the logical volumes have a predetermined relation and are included in a logical volume group,
wherein a copy of the logical volume group is created in a pool area different from the pool area to which the logical volume group belongs,
wherein the second processor monitors a capacity of the pool area to which the logical volume belongs,
wherein when an unused capacity of the pool area to which the logical volume belongs reaches a predetermined threshold or lower, the second processor requests the storage system to add to the capacity of the pool area to which the logical volume belongs,
wherein the first processor adds to the capacity of the pool area to which the logical volume belongs to meet the pool area capacity addition request,
wherein, when the pool area to which the logical volume belongs contains multiple logical volume groups, the second processor requests the storage system to create a sub-pool area for each of the logical volume groups included in the pool area to which the logical volume belongs,
wherein the first processor creates a sub-pool area for each of the logical volume groups to meet the pool area creation request,
wherein the second processor requests the storage system to create the logical volume groups included in the pool area to which the logical volume belongs, respectively for the created sub-pool areas,
wherein the first processor creates logical volume groups respectively in the created sub-pool areas that have been created for the multiple logical volume groups in the pool area to which the logical volume belongs based on the logical volume group creation request, and
wherein, when the pool area to which the logical volume belongs includes one logical volume group, the second processor requests the storage system to operate a sub-pool area in which the copy of the one logical volume group included in the pool area to which the logical volume belongs is created.

15. The computer system according to claim 14, wherein the logical volumes included in the logical volume group is determined as the predetermined relation to maintain data consistency.

16. The computer system according to claim 14, wherein the copy of the logical volume group is created in a pool area of a storage system different from the storage system that includes the copy source logical volume group.

17. The computer system according to claim 14, wherein the operation the pool area to which the logical volume belongs is a request to create a pool area including the copy of the logical volume group, as the capacity of the created pool area is same capacity of the pool area including the copy source logical volume group.

18. The computer system according to claim 14, wherein the pool area includes a first pool area and a second pool area; and
wherein, when there is an addition to the first pool area capacity, the second processor requests the storage system to make a capacity of the first pool area coincide with a capacity of the second pool area to which a logical volume group contained in the first pool area is copied.

19. The computer system according to claim 18, wherein the second processor monitors only the capacity of the first pool area.

20. The computer system according to claim 14, wherein, when a logical volume is to be newly created in the pool area to which the logical volume belongs, to newly create the second processor prohibits a logical volume that does not belong to a logical volume group included in the pool area.

* * * * *